May 22, 1956
D. B. GARDINER
2,746,426
HYDRAULIC POWER STEERING DEVICE
Filed March 1, 1954
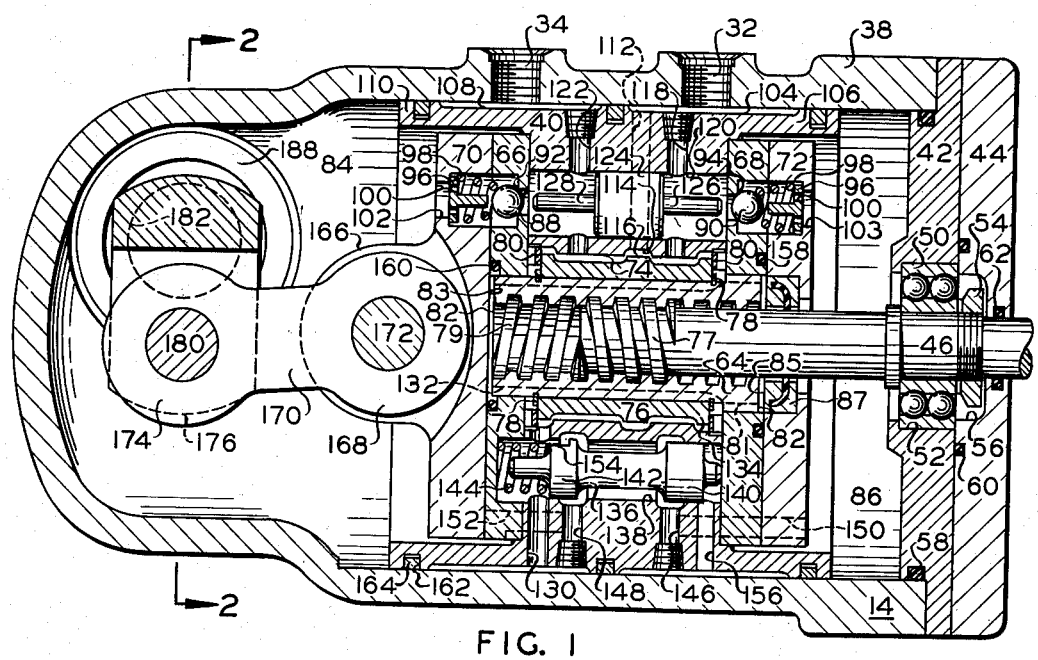
FIG. 1
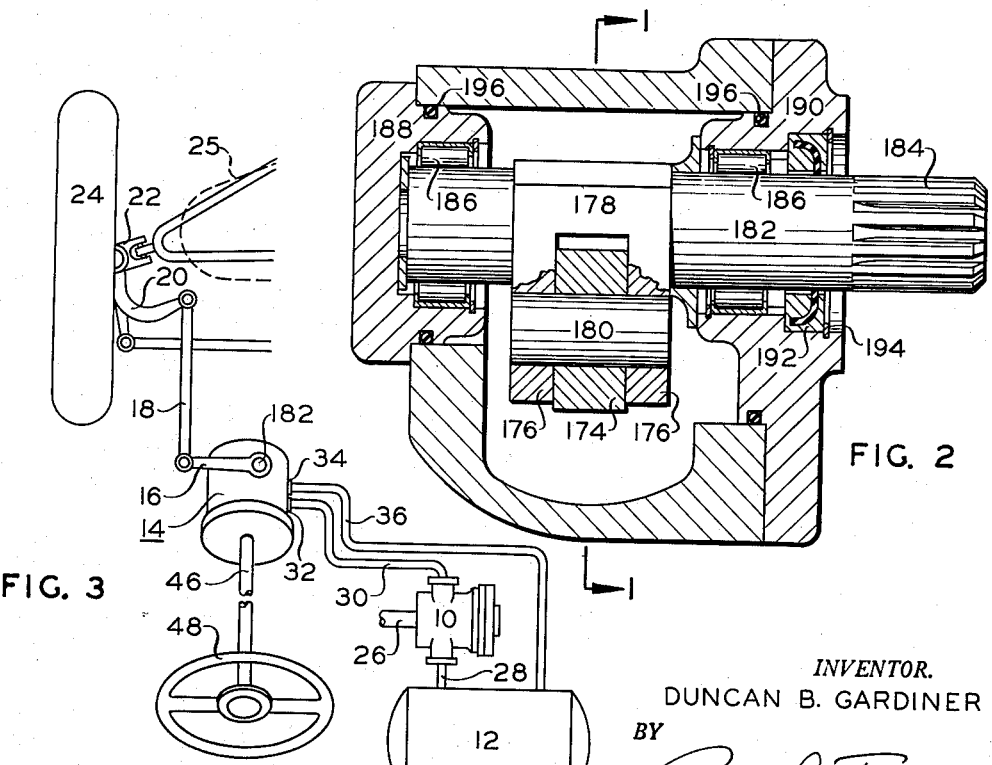
FIG. 2
FIG. 3
INVENTOR.
DUNCAN B. GARDINER
BY
*Ralph L. Tweedale*
ATTORNEY United States Patent Office 2,746,426
Patented May 22, 1956

2,746,426
HYDRAULIC POWER STEERING DEVICE

Duncan B. Gardiner, Detroit, Mich., assignor to Vickers Incorporated, Detroit, Mich., a corporation of Michigan Application March 1, 1954, Serial No. 413,357

6 Claims. (Cl. 121—40)

This invention relates to power transmissions, and is particularly applicable to those of the type comprising two or more fluid pressure energy translating devices, one of which may function as a pump and another as a fluid motor.

This invention is generally concerned with hydraulic power steering systems and in particular is concerned with a hydraulic power steering servomotor and valve mechanism device of the self contained type.

Although great strides have been made in improving vehicle power steering systems there is a need for simplified and lower cost systems of the self contained type which comprise a component of the vehicle rather than an optional accessory. The present invention is one solution to this need and is an improvement over present systems comprising a housing associated with the steering shaft containing a servomotor for actuating the pitman arm and a servo valve associated with the steering shaft and motor for both controlling the motor and producing a follow-up valve action.

In the past, it has been customary to utilize double acting servomotors incorporating seals of the sliding type which provide a wiping action of a piston rod associated with a fluid operated piston. Where the piston rod is exposed to atmosphere the seal must protect the internal system in continually wiping foreign matter on the rod before it enters the system. In layover periods foreign matter accumulates and hardens on the rod which adds to the burden imposed on the seal. Increased friction must be overcome and the seal life is shortened resulting in temporarily inefficient systems only corrected by costly layover or shut down periods.

Present systems of the self contained type are also costly because of complicated gearing and valving associated with the steering shaft which transmits the input signal for operation of the valve and motor and subsequent follow-up action of the valve. Many of the present system also utilize complicated and costly mechanism which adds to the bulk of the component in an attempt to provide manual steering operation in case of power failure, in reducing pump wear by lessening the burden on the pump when a power steering operation is not being performed, and in providing locking means to hold or lock the motor to the position steered to which is advantageous, for example, in heavy duty grading equipment.

It is therefore an object of this invention to provide an improved integral hydraulic power steering device.

It is a further object of this invention to provide an improved, self contained hydraulic power steering device of a more compact design which substantially alleviates packing friction and wearing difficulties, which is of lower cost to manufacture and which will be efficient over a long and useful life.

Further objects and advantages of the present invention will be apparent from the following description, reference being had to the accompanying drawing wherein a preferred form of the present invention is clearly shown.

In the drawing:

Figure 1 is a cross sectional view of a self contained hydraulic steering gear device embodying a preferred form of the present invention and taken on line 1—1 of Figure 2.

Figure 2 is a sectional view of a preferred form of the present invention taken on line 2—2 of Figure 1.

Figure 3 is a schematic diagram of a combined manually operated and hydraulic power steering system embodying a preferred form of the present invention.

Referring to Figure 3 there is shown a hydraulic power steering system comprising a pump 10 connected to a reservoir 12 and to a self contained hydraulic steering gear device indicated generally by the numeral 14. The device 14 is adapted to operate and control a pitman arm 16 on the side thereof. The pitman arm is connected by links 18 and 20 to conventional steering instrumentalities 22 of the independently sprung dirigible wheels 24, one of which is shown, of a vehicle whose cross frame member is indicated in dotted lines by the numeral 25. A shaft 26 of the pump 10 may be driven in a suitable manner from a power take-off or engine of the vehicle, not shown. The pump 10 is connected to the reservoir 12 by a supply conduit 28 and connected by a conduit 30 to a pressure port 32 of the device 14. A tank port 34 of the device 14 is connected by a conduit 36 to the reservoir 12.

Referring now to Figure 1, the device 14 is comprised of a cylinder 38 having a fluid operated piston 40 shiftably mounted therein. The large open end of the cylinder 38 is closed by end covers 42 and 44 which may be suitably bolted thereto and through which a steering shaft 46 extends. The steering shaft 46 may be manually operated by a steering wheel 48 suitably fastened thereto shown in Figure 3 and is rotatably supported in the cylinder 38 at one end thereof in bearings 50 mounted in a recess 52 of the cover 42 which are retained therein by a nut 54 threaded on the shaft 46 and located in a recess 56 of the cover 44. O-ring seals 58 and 60 seal respectively between the cylinder 38 and cover 42 and between the covers 42 and 44. Another O-ring 62 in the cover 44 provides proper sealing for the rotary shaft 46. The shaft 46 is rotatably mounted at its opposite end by means of a nut 64 threaded on the shaft 46 and which is supported in a retainer and closure member 66. The opposite end of the piston is also provided with a retainer and closure member 68 substantially similar to that of the member 66. The piston 40 is provided in addition with end members 70 and 72 adapted to co-operate respectively with members 66 and 68. The members 66 and 70 and the members 68 and 72 may be fastened to the piston at opposite ends thereof by means of suitable screws not shown.

Completely mounted within a bore 74 of the piston 40 is a servo valve 76 carried by the nut 64. The shaft 46 is externally threaded at its inner end indicated by the numeral 77, to mate with internal threads 79 of the nut 64. The shaft 46 is prevented from shifting axially and rotation of the shaft actuates the nut slightly axially. The valve 76 shifts with the nut 64 by reason of snap rings 78 carried by the nut and which abut opposite ends of the servo valve and is permitted to shift slightly axially against the bias of wave washers 80. The nut 64 is spline connected to member 68 at 81 to prevent rotation of but permit axial movement of the nut. The movement of the servo valve is limited by the amount the nut is permitted to be operated axially before either of the opposite flat end faces 82 thereof contact adjoining flat faces 83 or 85 respectively of the member 70 or of a shaft seal retaining member 87. When the end faces 82 of the nut 64 comes into abutment with either of the adjoining flat end faces 83 or 85 of the members 70 or 87 the servo valve will have been shifted to motor operating position and the nut, valve, and piston will shift together axially. At the completion of the steering shaft movement valve 76 is restored to neutral position relative to the piston due to the continued slight movement of the piston after steering effort ceases. The wave washers, under some conditions will restore the valve to a neutral position. If the steering wheel is released and the valve is not in a neutral position the wave washers will return the same to a neutral position. For example, the wave washers return the valve to a relative neutral position when the dirigible wheels are incapable of turning because of a curb-stone abutment in which case the return of the valve to the neutral position prevents the pump from working under high load conditions. The valve 76 is adapted to control porting and passageway construction in the piston, to be later explained, to admit fluid either to a left end motor chamber 84 or to a right end motor chamber 86 through check valves 88 or 90 which are normally positioned on seats 92 and 94 formed in the members 66 and 68. Duplicate spring retains and springs 96 and 98 mounted in the end members 70 and 72 complete the check valve assemblies. The retainers 96 are provided with a plurality of ports 100 permitting flow ports 102 and 103 respectively in the members 70 and 72 to and from the chambers 84 and 86 when the check valves are unseated.

The cylinder pressure port 32 is always connected to a sliding, grooved pressure port 104 formed in the periphery of the piston 40 which also extends into the periphery of a rightwardly extending flange 106 of the piston 40 and within which members 68 and 72 are mounted. The cylinder tank port 34 is always connected to a sliding grooved tank port 108 also formed in the periphery of the piston 40 and which also extends into the periphery of a leftwardly extending flange 110 of the piston 40 within which the members 66 and 70 are mounted.

The pressure supply passage 112 leads from the piston pressure port 104 to a servo valve port 114 which a center land 116 of the servo valve 74 controls. When the servo valve 76 shifts leftwardly the pressure port 116 is connected to an operating port 118 leading to a bore 120, the right end of which leads to the chamber 86 and which is controlled by the check valve 90. When the servo valve shifts rightwardly the pressure port 116 and passage 112 are opened by the center land 116 to an operating port 122 leading to the opposite end of the bore 120 which leads to the chamber 84 and which is controlled by the check valve 88. In the neutral position shown the center land 116 permits communication between the pressure passage 112 and pressure port 114 with both operating ports 118 and 122. One of the operating ports 118 or 122 is blocked from the pressure port 104 and pressure supply passage 112 when the servo valve is operated from the neutral position shown dependent upon the direction of operation of the valve.

When the servo valve 76 is operated rightwardly pressure fluid entering the left end of bore 120 acts against the left end surface of a piston valve 124 shifting the same rightwardly and a stem 126 carried thereby contacts the check valve 90 moving the same from its seat to permit return flow therethrough from chamber 86. When the servo valve 76 is operated leftwardly pressure fluid is conducted to the right end of bore 120 to act on the right end surface of piston valve 124 shifting the same leftwardly and a stem 128 carried thereby contacts the check valve 88 moving the same from its seat to permit return flow therethrough from the chamber 84.

When the motor piston 40 is operated leftwardly, displacement from chamber 84 is conducted through the open check valve 88 to the bore 120 and by means of operating port 122 to bore 74 in which servo valve 76 is mounted. A vertical tank passage 130 is constructed in the motor piston 40 for connecting the servo valve bore 74 to the grooved tank port 108, thus permitting return flow from the chamber 84 to be directed to the cylinder tank port 34. When the motor piston 40 is operated rightwardly, fluid displacement from the right end of motor chamber 86 is conducted through the opened check valve 90 to the right end of bore 120 and by means of operating port 118 to the servo valve bore 74. Wave washer 80 permits flow between the end faces of the servo valve 76 and the retainer member 68 to cut away portions 132 of the nut 64 which extend completely to the inner end of the nut and perform the function of fluid return passages. The cutaway portions 132 permit flow to be conducted between the left end face of servo valve 76 and the inner face of member 66 to the left end of bore 74 which is connected to the vertical tank passage 130. The servo valve is also constructed with end lands both of which are indicated by the numeral 134 and are adapted to control the connections between the operated ports, the bore 120, and the cutaway portions 132 in the nut 64.

For the purpose of permitting manual operation of the steering gear device 14 in case of power failure, the motor piston 40 also has shiftably mounted therein a pressure responsive piston valve 136 within a longitudinal bore 138. The valve 136 is adapted to connect opposite ends of the motor to each other upon power failure and to close the opposite ends to each other when the pump is in operation. The valve 136 is provided with end lands 140 and 142 and is urged to the position shown by a spring 144. The lands 140 and 142 respectively control vertical passages 146 and 148 both of which are connected at their inner ends to the bore 138 and are respectively connected at their opposite ends to the piston pressure port 104 and tank port 108. Motor chamber 86 is connected to the vertical passage 146 by a longitudinal passage 150 extending through the members 72, 68 and motor piston 40 and the motor chamber 84 is connected to the vertical passage 148 by means of a longitudinal passage 152 extending through the members 70 and 66 and motor piston 40. Due to the extension of steering shaft 46 into the chamber 86 the displacement on opposite sides of the piston 40 is unequal. The differential displacement of the chambers is compensated for when the pump is not in operation by providing a flat 154 in the land 142 of piston valve 136. Upon power failure, when the piston 40 is manually operated rightwardly displacement from chamber 86 is conducted to chamber 84 by means of passages 150 and 146, bore 138 and passages 148 and 152. Make up fluid to compensate for the differential in displacement is conducted to chamber 84 by means of cylinder tank port 34, piston tank port 108, tank passage 130, bore 138 and by means of the flat 154 to the passages 148 and 152 and thence to chamber 84. In the opposite direction of manual operation of piston 40 fluid displacement from chamber 84 in excess of chamber 86 requirements is conducted to the tank passage 130 by means of passages 152 and 148, bore 138 and flat 154. However, when the pump is in operation the piston valve 136 will continually be shifted completely to the left by means of pressure fluid delivered to the right end of bore 138 through a vertical passage 156 in the motor piston 40 which continuously connects the piston pressure port 104 to the right end of bore 138. A pressure sufficient to keep the valve 136 shifted completely to the left is created in the right end of bore 138 because of the pressure build-up ahead of port 114 of servo valve 76. The land 116 of servo valve 76 in the center portion shown creates a restriction at the port 114 sufficient to create a pressure for overcoming the valve spring bias which is transmitted to the right end of bore 138 by means of vertical passage 156. When the valve 136 is shifted leftwardly the land 140 blocks passage 146 and the flat 154 of land 142 passes out of communication with passage 146 so that the opposite motor chambers are no longer in communication with each other.

O-ring seals 158 and 160 are utilized respectively between the members 68 and 72 and between the members 66 and 70. The motor piston 40 is also provided with grooves 162 in which piston rings 164 are mounted, thus providing proper sealing between the peripheral surface of the piston and cylinder walls and sealing the motor piston ports from each other which extend to the piston peripheral surface.

The end member 70 is provided with a two-armed yoke, one arm of which is shown and indicated by the numeral 166, between the arms of which one end 168 of a link 170 is pivotally connected by a pin 172. The opposite end of the link 170, indicated by the numeral 174, is pivotally connected between the arms 176 of a crank member 178 by a pin 180. A cross shaft 182 adapted to be rotated by the crank 178, is provided with splines 184 at its outer end extending from the motor cylinder. The splines 184 are adapted to mate with internal splines of the pitman arm 16 for actuating the latter. The cross shaft 182 is rotatably mounted in needle bearings 186 mounted in closure members 188 and 190 which close openings on opposite sides of the cylinder 38 and which may be suitably screwed to the cylinder. A seal 192 for the shaft 182 is mounted in the closure member 190 and retained therein by means of a snap ring 194. O-rings 196 seal the cylinder and closure members.

In operation with the pump 10 being driven from the engine or power take-off of the vehicle, the piston valve 136 is operated leftwardly to close communication between motor chambers 84 and 86 as follows: fluid from pump 10 is conducted by conduit 30 to the pressure port 32 of the power steering device 14 and by means of piston pressure port 104 to passage 156 leading to the right end of bore 138 in which piston valve 136 is mounted. Pressure fluid acting on the right end face of the valve shifts the same against the slight bias of spring 144 and the land 140 thereof closes passage 146 and land 142 blocks passage 130 from passage 148. In this manner passages 150 and 152 which are connected to the opposite motor chambers are closed from communication with each other. As stated previously, the pressure increase in the servo valve port 114 with the land 116 of the servo valve in the neutral position shown, and which is transmitted to the right end of valve bore 138 by the ports and passages recited, is sufficient to overcome the slight resistance offered by spring 144. Fluid displaced from the left end of the bore 138 as the valve shifts is delivered to the tank passage 130 and thence to tank 12.

When a power steering operation is not being performed the discharge side of pump 10 is connected to reservoir 12 as follows: displacement from the pump 10 delivered to the pressure port 114 of servo valve 76 by passage 112 is divided at the port 116 with a portion of the flow being conducted by bore 74 directly to the tank passage 130 and the other portion being conducted by bore 74 to the right end of servo valve 76 to the cutaway portions 132 of nut 64 which are connected to the passage 130 where the divided flow converges. From the passage 130 the displacement from pump 10 is conducted to piston tank port 108 and thence by means of cylinder tank port 34 and conduit 36 to reservoir 12.

If the steering shaft 46 is rotated in a direction to operate the nut 64 axially to the left the nut will shift axially until the left flat end face 82 thereof comes into abutment against the adjoining flat end face 83 of the member 70. The servo valve is carried by the nut 64 and the movement of the nut 64 is sufficient to enable land 116 of the valve to close the pressure port 114 thereof to the operating port 122 and to open the pressure port 114 to operating port 118. Pressure fluid is then conducted from operating port 118 to bore 120 of piston valve 124 and by means of check valve 90 and port 103 to motor chamber 86. The piston 40 will be fluid operated leftwardly as long as the steering shaft 46 is rotated within the limits designed into the system. In the meantime pressure fluid entering bore 120 through operating port 118 has shifted piston valve 124 leftwardly and the stem 128 thereof shifts check valve 88 from its seat and fluid displacement from motor chamber 84 is able to flow through the port 102 and the open check valve 88 to the left end of bore 120 and to operating port 122. From the operating port 122 fluid displacement from motor chamber 84 is conducted by servo valve bore 74 to tank passage 130 and by means of piston tank port 108, cylinder tank port 34, and conduit 36 to the reservoir 12. When the steering shaft movement stops the servo valve 76 is restored to the neutral position relative to the piston 40 due to the slight continued movement of the piston after the steering effort ceases.

The check valves 88 and 90 lock fluid in the motor chambers 84 and 86 so as to prevent movement of the piston 40 and thus lock the motor and dirigible wheels to the position steered to and also in the neutral steering position shown.

When the steering shaft 46 is rotated in a direction to shift the nut 64 axially rightwardly the movement of the nut will be limited by the right end face 82 of the nut 64 coming into abutment with the inner flat face 85 of the seal retaining member 87. In this operating position of the servo valve 76, pressure port 114 is connected to operating port 122, and, by means of valve bore 120, check valve 88, and port 102 to motor chamber 84, and the delivery of the pump operates the piston 40 in a rightward directional movement. Pressure fluid conducted to the left end of bore 120 shifts the piston valve 124 rightwardly and the stem 126 thereof shifts check valve 90 from its seat 94 to enable displacement from motor chamber 86 to pass through the open check valve 90 to the valve bore 120. From the valve bore 120 fluid displacement from motor chamber 86 is conducted by operating port 118 to servo valve bore 74 and to the cutaway portions 132 of nut 64, the wave washer 80 permitting flow between the end surface of servo valve 76 and member 68. From cutaway portions 132 of nut 64 fluid displacement is conducted to the passage 130, tank ports 108 and 34 and by conduit 36 to tank 12. When the steering operation is completed the servo valve 76 is returned as previously recited to the neutral position shown due to the slight continued movement of the piston 40. When the servo valve 76 returns to the neutral position shown after a steering operation in either direction of operation, the chambers formed on opposite sides of the piston valve 124 are connected to reservoir 12 and the check valve springs 98 return their associated check valves 88 or 90 to the closed position to lock the motor in the steered position or in the neutral position. When the piston 40 is operated axially in either direction the link 170 is actuated which in turn actuates the crank 176 to rotate the cross shaft 182 and thus the pitman arm 16 to power operate the dirigible wheels of the vehicle.

If, for any reason, the power in the system fails, piston valve 136 will be returned to the position shown by the spring 144 thereof and the dirigible wheels may be manually steered through the direct connection of the steering shaft 46, nut 64, piston 40 and instrumentalities linking the piston to the dirigible wheels. The motor chambers 84 and 86 are connected to each other to permit manual operation of the piston 40. The motor chambers are also connected to the reservoir because of a differential in the displacements of the chambers. With the position of piston valve 136 as shown, when the dirigible wheels are manually steered upon power failure, the motor is actuated through the linkage and the two motor chambers are connected to each other by means of the piston passages 152 and 150, 146 and 148, and the piston valve bore 138. Additional fluid needed from the reservoir 12 because of the differential in motor chamber displacement is secured by means of passage 130 and the flat 154 of land 142 which permits communication with the valve bore 138 and additional supply is thence directed as needed.

It should thus be noted that the invention provides a compact component for providing power steering for vehicles. The size of the device is greatly reduced from that of conventional devices by mounting all necessary valving for performing a multiplicity of functions in the servomotor piston which serves as a housing for the same.

Friction has been reduced to a minimum by eliminating unnecessary gearing and sliding types of seals wherever possible and in particular in providing a component which eliminates the necessity for utilizing sliding types of seals exposed to atmosphere which must perform a wiping job on a piston rod slidable therethrough which increases friction and reduces the life of the seal. This is accomplished by providing a servomotor and valve mechanism device which may be controlled by a rotary steering shaft entering into the housing of the device to operate the servo valve and by having the pitman arm actuating means of the motor extending laterally from the housing of the device and being of the rotary rather than the axial movement type.

The device is completely automatic in providing a system connecting the opposite ends of the motor to each other and to a fluid supply source in case of power failure and closing the opposite motor chambers to each other for a power steering operation.

The steering gear device is also designed for easy installation and removal from the vehicle and provides a compact unitary structure including motor and all necessary valving requiring only two external fluid connection ports.

While the form of embodiment of the invention as herein disclosed constitutes a preferred form, it is to be understood that other forms might be adopted, all coming within the scope of the claims which follow.

What is claimed is as follows:

1. An integral hydraulic servomotor and valve mechanism device comprising in combination a cylinder having a fluid operated piston reciprocally mounted therein to form expansible chambers on opposite sides thereof and having a shaft member associated therewith for actuation thereby extending from the cylinder for actuation of a load device, said cylinder having external connection pressure supply and return ports leading to the piston, a servo valve shiftably mounted in the piston having a range of movement from either side of a neutral motor stop position to control the directional operation of the piston, operating means for the servo valve mounted in the piston and including means extending from the piston and the cylinder for selective operation of the servo valve, resilient means biasing the servo valve to the neutral position, means forming pressure supply and return passages and motor operating passages in the piston connecting the cylinder pressure supply and return ports and the expansible chambers to the servo valve, a lock valve in each motor operating passage permitting flow to said chambers and adapted to trap fluid in the motor chambers for locking the piston in the position operated to, a fluid operated member shiftably mounted in the piston and controlled by the servo valve, said member being operated to one position to open one of the lock valves in one position of operation of the servo valve and being operable to another position to open the other lock valve in another operating position of the servo valve, and means returning the member to a neutral valve locking position in the neutral position of the servo control valve.

2. An integral hydraulic power steering gear device comprising in combination a cylinder having a piston reciprocally mounted therein to form expansible chambers on opposite sides of the piston for admission and displacement of fluid to actuate the piston, a shaft rotatably mounted in one of said chambers and extending through a side of the cylinder adapted for actuation of a vehicle steering system linkage element such as a pitman arm, means associated with the piston and the shaft for translating axial movement of the piston to rotary motion of the shaft, a servo valve within the piston for controlling the directional operation thereof, a rotary steering shaft extending into the cylinder and the piston and having an operating member threaded therein within the piston and upon which the servo valve is mounted and carried, said member shifting axially in response to rotation of the steering shaft to shift the servo valve to operating positions either side of a neutral motor stop position, means resiliently biasing the servo valve to the neutral position and means limiting the axial movement of the operating member whereby upon rotation of the steering shaft the operating member and servo valve may shift axially relative to the piston and then continue to shift with the actuated piston, the servo valve being adapted to be returned to the neutral position upon cessation of operation of the steering shaft by slight continued movement of the piston, means forming external connection pressure and return ports in the cylinder, means in the piston forming pressure supply and return passages respectively connected to the cylinder pressure supply and return ports and to the servo valve and also forming passages connecting the expansible chambers to the servo valve, a lock valve mounted in each expansible chamber passage permitting flow to the chambers and resiliently biased to a closed position preventing flow from the chambers, said lock valves being adapted to lock the piston in the position operated to, and a fluid operated member shiftably mounted in the piston for shifting the lock valves to the open position, said servo valve in operating positions either side of its neutral position directing fluid to operate the member in a manner to open one of the lock valves through which fluid is adapted to flow from one of the expansible chambers.

3. An integral hydraulic power steering gear device adapted for steering the dirigible wheels of a vehicle and comprising in combination a fluid motor including a cylinder having a fluid operated piston reciprocally mounted therein, an output shaft rotatably mounted in the cylinder extending laterally therefrom, means associated with the piston and shaft translating axial movement of the piston to rotary motion of the shaft, a servo valve for controlling directional operation of the piston mounted in the piston, means forming pressure supply and return passages in the cylinder and in the piston and also forming operating passages in the piston opening to expansible chambers formed on either side of the piston, said servo valve including means for interconnecting the passages in a manner to provide operation of the motor in opposite directions when shifted to positions on opposite sides of a neutral motor stopping position, a steering shaft extending into one end of the cylinder and into the piston and having a servo valve operating member threaded thereon mounted in the piston upon which the servo valve is mounted and carried, said member being shifted axially in response to rotation of the steering shaft, means forming abutments in the piston limiting axial movement of the member in opposite directions, means resiliently biasing the servo valve to the neutral position, whereby said member and servo valve are shifted axially together relative to the piston to initiate power operation of the piston and then move together with the piston dependent upon steering shaft operation, said servo valve returning to the neutral motor stop position upon cessation of steering shaft operation by slight continued movement of the piston, a lock valve for each expansible chamber mounted in the piston, each lock valve permitting flow to the expansible chamber but in the closed position preventing flow therefrom for the purpose of locking the piston in the position operated thereto, a fluid operated member shiftably mounted in the piston and controlled by the servo valve, said member being operated in opposite directions in response to the servo valve being shifted in opposite directions from the neutral position to open the lock valve through which fluid is adapted to be flowing from one or the other of said expansible chambers, and means returning the member to a neutral lock valve closing position with the servo valve in the neutral position.

4. In a hydraulic power actuator comprising a cylinder and fluid actuated piston therein forming expansible chambers on opposite sides of the piston, the combination of separate operating passages in the piston leading to each chamber adapted to be selectively connected to a hydraulic power energizing source and a return source for operating the piston in opposite directions, a lock valve in each operating passage permitting flow to the expansible chambers and adapted to trap fluid in the chambers for locking the piston in the position operated to, a member shiftably mounted in the piston for opening the lock valves including fluid operating means exposed to pressure in the operating passages for selectively shifting the member in a direction to open the lock valve controlling the chamber from which fluid is being displaced during motor operation, and means returning the member to a neutral valve locking position when the operating passages cease to be energized.

5. In a hydraulic power actuator comprising a cylinder and fluid actuated piston therein forming expansible chambers on opposite sides of the piston, the combination of separate operating passages in the piston leading to each chamber adapted to be selectively connected to a hydraulic power energizing source and a return source for operating the piston in opposite directions, a lock valve in each operating passage permitting flow to the expansible chambers and adapted to trap fluid in the chambers for locking the piston in the position operated to, a member shiftably mounted in the piston for opening the lock valves including fluid operating means exposed to pressure in the operating passages for selectively shifting the member in a direction to open the lock valve controlling the chamber from which fluid is being displaced during motor operation, means returning the member to a neutral valve locking position when the operating passages cease to be energized, means for manually operating the piston in case of hydraulic power source failure, and means interconnecting the chambers in case of said power failure.

6. In a fluid motor comprising a cylinder having a fluid operated piston therein for driving a load device and forming expansible chambers in the cylinder on opposite sides of the piston, said piston having a servo valve shiftably mounted therein including manually operable means associated therewith extending from the cylinder for selectively operating the servo valve from either side of a neutral motor stop position for selectively connecting pressure delivery and return passages formed in the cylinder and piston to motor operating passages in the piston leading to the expansible chambers for controlling the directional operation of the piston, the combination of a lock valve in each motor operating passage permitting flow to the expansible chambers and adapted to trap fluid in the chambers for locking the piston in the position operated to, a fluid operated member shiftably mounted in the piston and controlled by the servo valve, said member being operable to open any one of the lock valves for permitting return flow from any one of the chambers during motor operation, which lock valve being opened by the member depending upon the operational position of the servo valve, and means returning the member to a neutral valve locking position in the neutral position of the servo control valve.

UNITED STATES PATENTS

References Cited in the file of this patent

| | | |
|---|---|---|
| 1,934,719 | Knox | Nov. 14, 1933 |
| 1,937,485 | Davis | Nov. 28, 1933 |
| 1,955,154 | Temple | Apr. 17, 1934 |
| 1,959,177 | Sassen | May 15, 1934 |
| 2,628,594 | Teague | Feb. 17, 1953 |
| 2,681,043 | Irwin | June 15, 1954 |